UNITED STATES PATENT OFFICE.

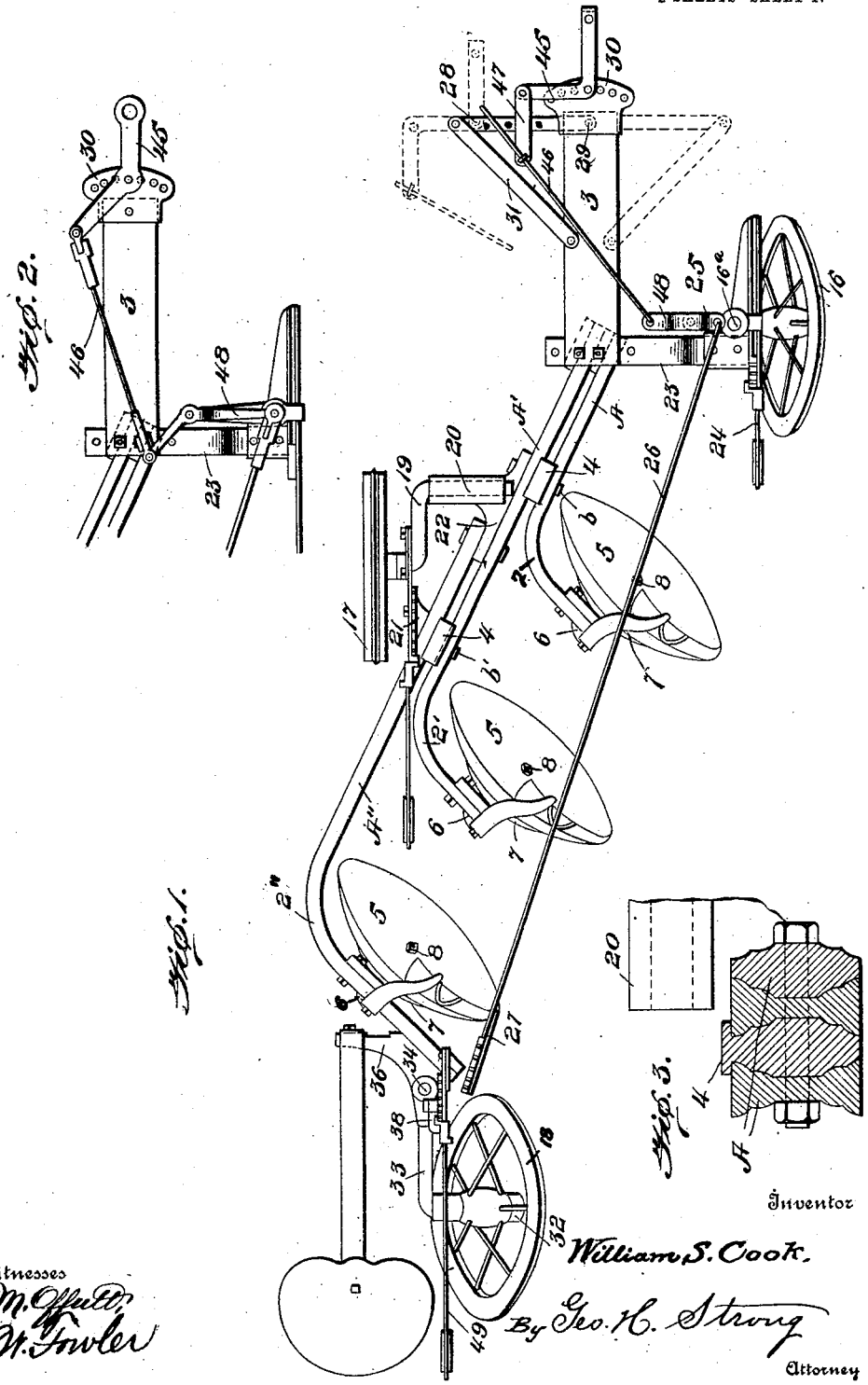

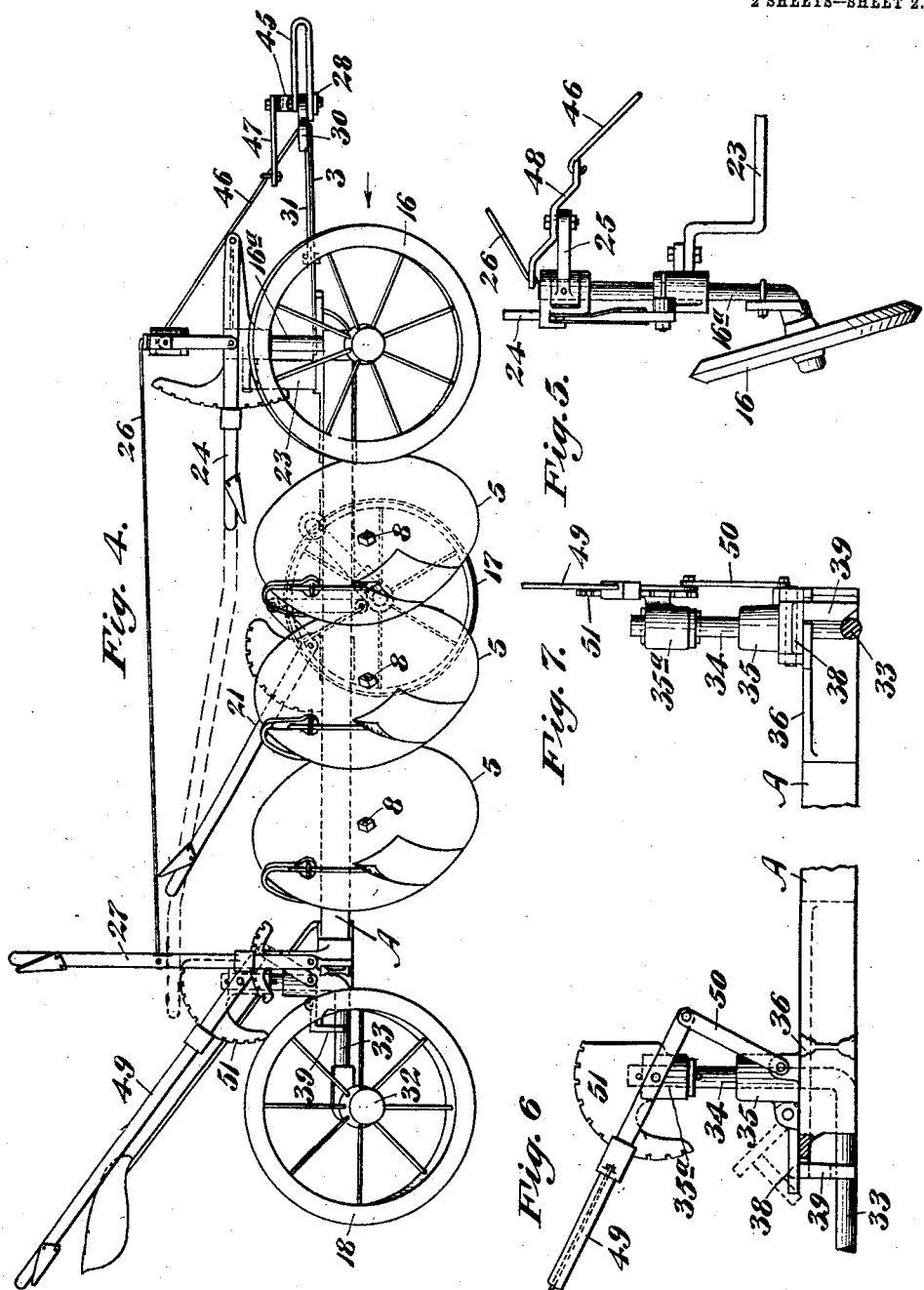

WILLIAM S. COOK, OF SAN JOSE, CALIFORNIA.

DISK PLOW.

No. 810,620.    Specification of Letters Patent.    Patented Jan. 23, 1906.

Application filed February 25, 1904. Serial No. 195,209.

*To all whom it may concern:*

Be it known that I, WILLIAM S. COOK, a citizen of the United States, residing at San Jose, in the county of Santa Clara and State of California, have invented new and useful Improvements in Disk Plows, of which the following is a specification.

My invention relates to improvements in disk plows and appurtenances therefor.

It consists in a novel construction of the plow-beam sections and their peculiar curvature and position with relation to the draft-line whereby said beams instead of standing approximately in the line of travel of the plows are set off in lines diagonal to said line of travel.

It comprises a means for adjusting the furrow and land wheels so that the plows may be made to run closely against the trees of an orchard, for which this plow is especially designed. Means are provided for regulating and varying the draft of the apparatus so that the plows may be caused to run either to right or left with relation to the team by which they are hauled, and means are provided for the holding and release of the rear wheel, so that the wheel may be allowed to swivel when it is desired to turn the plow to the right and locked against such movement under ordinary conditions of use, the wheel being free when turning to the left.

My invention also comprises details of construction, which will be more fully explained by reference to the accompanying drawings, in which—

Figure 1 is a plan view of the plow. Fig. 2 is a plan of front end, showing the front draft and turning attachment directly connected. Fig. 3 is a transverse section of beams and locking-blocks. Fig. 4 is a side elevation of the plow. Fig. 5 is a partial front view showing the furrow-wheel with its turning post and attachments and lock-blocks. Figs. 6 and 7 are separate enlarged views of the trailing-wheel shaft, turning post, and attachments.

A A' A" are the sections of the plow-beam, which are made in such sizes and so shaped that each section serves for the mounting of one of the disks of which the plow may be composed. These beam-sections are curved, as shown at 2, 2', and 2", and are so fixed to the draft-bar 3 that the straight portions of the sections lie to the left of the line of the bar 3 and the line of draft, and thence the rear portion is curved inwardly toward the line of draft, as shown, to extend diagonally to the line of travel. These beams are preferably made of steel and of vertical I section, and at the point of junction between the rear of the straight portion of each beam and the front of the next succeeding beam I employ locking-blocks 4, which are so shaped as to fit into the concaved sides of the contiguous parts of the beams A, and bolts $bb'$, passing through these locking-blocks and the beams, serve to hold them firmly together. The shape of the locking-blocks fitting the corresponding shapes of the beam sides, as in Fig. 3, prevents any twisting or turning and locks them together as a single solid structure. The rear diagonal portion of each of these beams carries a concavo-convex disk 5. These disks are mounted upon hubs 6, having concaved disk portions at the front, as shown at 7, into which the convex backs of the plow-disks 5 are fitted and supported. Screw-bolts 8 project from the hub 6 through the center of the disk, and by means of nuts screwed firmly upon the threaded ends of the bolts the disks 5 are locked to the hubs. The plow-beams are carried upon the front right-hand or furrow wheel 16, upon a left-hand or land wheel 17, and upon a rear wheel 18, these wheels being attached to the frame, as follows: The left-hand wheel 17 has a crank-axle 19, which is turnable in a box 20, and by means of a lever and rack, as at 21, it may be moved so as to raise or depress the plow-frame at will. This box 20 has an extension, as at 22, and this may enter between the two contiguous parts of the beam-sections A' A" and may thus form one of the locking-blocks for the beams, the other one being set at the proper distance therefrom to form the union between the two beam-sections, as previously described.

Across the front of the plow-beams extends a beam 23, which is bolted to the plow-beam, as shown, and adjustable transversely. This beam 23 stands approximately at right angles with the draft-bar 3, and the plow-beams extend diagonally to the left backwardly from this transverse beam, as previously described. This beam 23 is bent upwardly, as shown, and at its right end it carries the standard of the furrow-wheel 16. The furrow-wheel is mounted upon a short shaft having an upturned vertical portion $16^a$, which is slidable in the standard and is operated in the usual manner to raise or lower by means of a lever 24. To the upper end of this vertical portion 16ᵃ is connected a crank-arm 25, and this is movable to turn the wheel 16 around its vertical axis by means of a rod 26, which may connect with the crank-arm 25 and extends back to a point within convenient reach of the driver, who sits upon the seat at the rear of the machine. The rear end of the rod 26 is connected with a suitable lever, as at 27, and by means of the customary pawl-and-rack mechanism it may be held at any desired point of adjustment. By thus bending the transverse bar 23 upwardly I am enabled to provide a sufficient clearance and room for the standard and vertical swivel-post 16ᵃ of the wheel 16, and the lever by which this wheel is raised and lowered is so fulcrumed at the front end and connected with the movable part that when the wheel is adjusted to the operative position of the plow this lever will be lowered to approximately horizontal position. The same arrangement is made for all the actuating-levers except the lever 27, which turns the forward wheel, and this is little higher than the seat-level. By this construction the plows may be run beneath overhanging leaves or foliage and close up to the bodies of the trees or plants without interference of these levers. The beam 23 also has a number of bolt-holes made in line at the point where it crosses and is secured to the draft-bar 3, and by changing the bolts in these bolt-holes the wheel 16 may be brought nearer to and farther from the line of travel of the plows, and thus allow the plows to travel more closely to the line which it is desired to cultivate.

The draft may be changed as follows: 28 is a bar pivoted, as at 29, adjacent to the central clevis 30 and having holes made through it. This bar projects transversely from its connecting-point 29, and a brace-bar 31 connects its outer end with the draft-bar 3. By disengaging one end of this brace the bar 28 may be turned to project either to the left or right of the bar 3 and be held in position by the brace-bar 31, and the change of position or point of attachment of the team changes the line of travel of the plows to the right or left.

Although the wheel 16 may be turned about its vertical swivel-post by the crank-arm 25, rod 26, and hand-lever 27, it is sometimes desirable to turn this wheel in unison with the movements of the team and independent of any movement of the lever 27. For this purpose I have shown an angular or bell-crank lever 45 fulcrumed to the front of the bar 3 by a pin through its angle, so that one arm of the lever extends substantially in line with the draft-bar and carries means for the attachment of the team. The other arm extends to one side of the draft-bar, and a rod 46 is connected with it either directly or by a link 47 or equivalent connection. The rear end of this rod is connected with one end of an arm 48, centrally pivoted to the crank-arm 25, while the rod 26 is connected with the opposite end of the arm 48. By this construction the driver may by movement of the lever 27 turn the wheel 16 from one side to the other without changing the line of travel of the team; but when the plow is to be turned or its direction changed by turning the team the side pull thus exerted upon the bell-crank lever 45 will act, through the rod 46 and the lever-arm 48, to turn the wheel 16 without moving the lever 27, which, acting through the rod 26, holds one end of 48 stationary, so that the pull on the rod 46 acts through the other end of 48 and upon the arm 25, to which 48 is pivoted.

The rear wheel 18 has a hub revoluble upon a shaft, and upon the outer end of the hub is a cap, as at 32, to prevent the admission of dirt or the escape of lubricant. From the spindle upon which the wheel turns extends the bent arm 33, which is turned upward to form the vertical turning post 34, and this turning post is supported in a vertical sleeve 35, which projects upward from the plate or extension 36 of the rear end of the rear plow-beam, as shown. The rear end of this extension 36 carries a plate 38, having an arm 39 projecting downwardly, so as to normally stand in line with the shaft 33 and prevent its turning to one side by the swiveling of post 34 in its box, said arm having its lower end inclined diagonally to the horizontal portion of the axle. This keeps the wheel in position while the plow is moving ahead, and while it allows the wheel to swivel freely when the plow is turning to the left it will be understood that while traveling in a straight line the pressure of the angularly-placed wheels 16 18 against the land will prevent the wheel from turning to the left while thus proceeding in a straight line. Referring to Figs. 6 and 7, when the lever 49 (shown in these figures and in Fig. 4) is raised the part marked 36 is lowered, thus bringing the shaft 33 close up under the rear projection or plate 38 and above the incline portion of the arm 39, Fig. 7, at the left. This is the position when the plow is going forward or when turning to the left; but when I want to turn to the right the lever 49 must either be lowered to the bottom of its rack or the block 38 must be tilted up, as shown in dotted lines in Fig. 6, which allows the arm 33 to pass under the plate 38 and to turn to the right. After the turn has been made and the plow is again straight the lever 49 is again raised to engage the left side of the plate 38 or this part may be depressed and the inclined portion of arm 38 serves to force the axle over to the left, if it is just beneath this part. If the lower end of the plate 38 were square, it would strike the axle on top and could not be forced down or the axle brought up in its position to the left without the driver getting off and doing it manually. There is a certain amount of pressure on the wheel and on this arm 33, which would cause the shaft to swing directly under this block 38 if not engaged against the vertical left side of the block above the incline, as previously described; but when the lever 49 is raised and the shaft 33 is above and to the left of the incline this shaft 33 cannot swivel to the right, but holds the rear end of the frame from going to the left or toward the land when the disks are in the ground. It is not intended to work automatically when you turn to the right, for I must either raise the block 38 or lower the lever 49 to allow a right turn; but after such turn has been made and the block 38 pressed down it forces the shaft 33 to its proper place on the left by reason of the incline on arm 39, as previously stated. The raising or depression of the vertical turning post 34 within its sleeve is effected by the lever 49, which has one end fulcrumed to a link 50, the other end of which link is connected with the plate 36 or other part of the frame. The rack 51, with which the pawl on the lever 49 engages, is fixed or cast upon a sleeve $35^3$, and this moves in unison with the sleeve, so as to stand in constant relation with the lever and pawl, and by this construction the movement of these parts is independent of the turning of the wheel.

Having thus described my invention, what I claim, and desire to secure by Letters Patent, is—

1. The combination in a disk plow, of beam-sections having a substantially straight front portion, said front portions arranged one parallel with the other and overlapping each other, a draft-bar in the line of travel of the machine, attachments by which the straight portion of the front section is supported therefrom at an angle divergent from the line of travel, said sections having curved rear ends extending at an opposite angle from the front portion, means for supporting revoluble disks from said curved rear ends of the beams and locking-blocks interposed between and interlocking with the overlapping beam-sections and bolts whereby the parallel straight portions of a plurality of beams are rigidly united.

2. The combination in a disk plow of a sectional beam composed of a plurality of straight I-shaped overlapping sections, having parallel straight front portions arranged at an angle with the line of draft, and having bent rear portions, correspondingly - shaped locking-blocks fitting the contiguous concavities of the beam-sections and bolts whereby said blocks and a straight front portion of a plurality of sections are rigidly locked together, a draft-bar to which said beams are united so that the front portions extend diagonally away from the line of travel, and their rear ends diagonally in the opposite direction, standards fixed to said rear ends and journals by which the disks forming the plows are revolubly connected with the standards.

3. A plow comprising a diagonally - disposed sectional plow-beam, with means for rigidly uniting said sections, each section having the rear end bent inwardly toward and diagonally across the line of draft, revoluble plowing-disks supported from the inturned ends of the sections, a forward vertically-adjustable furrow-wheel, an intermediate adjustable land-wheel located upon the opposite side of the plow and a rear angularly-disposed supporting-wheel, an inclined axle upon which said wheel is turnable, said axle being bent and having a vertical and a horizontal portion, a sleeve within which said vertical portion is turnable, and a block having a downwardly-projecting arm adapted to engage the arm of the axle to maintain the wheel in its line of travel, said block having its lower end inclined diagonally to the horizontal portion of the axle.

4. A gang-plow consisting of a beam supported diagonally to the line of travel of the machine and having a revoluble disk plow connected therewith, land and furrow wheels by which the front of the plow is supported, a rear wheel having a bent and inclined axle, said axle having a vertical swivel-post, a box in which the post is freely turnable, a locking block and arm adapted to engage the bent axle to maintain the wheel substantially in line of travel, said block and arm being movable to disengage from the axle to allow the wheel to swivel when the machine is turned to the right, and said block having the lower end inclined diagonally with the horizontal portion of the axle.

5. A gang-plow comprising a beam and a plurality of plows carried thereby, land and furrow wheels, a vertical turning post upon which the front furrow-wheel is carried, a crank-arm connecting therewith, a lever centrally fulcrumed to the end of said crank, a rod connecting one end of said lever with a hand-lever and a second rod connecting the opposite end of the lever with a bell-crank lever to which the draft-team is attached.

6. The combination with a gang-plow, the draft-bar, bearing-wheels and turnable furrow-wheel, of a bell - crank lever having its angle pivoted at the front of the draft-bar, a connection with one arm for the attachment of the team, a rod connecting the other arm with a centrally - fulcrumed lever, a crank-arm fixed to the turning post of the furrow-wheel, upon which arm the said lever is fulcrumed, and a rod connecting the opposite end of the lever with the driver's lever whereby the furrow-wheel may be turned either by turning the team or by the hand-lever.

7. In a gang-plow, a bent beam, having a straight front portion arranged at an angle with the draft and having a rear portion extending diagonally with the front portion, a draft-bar with which said beam is connected so that the beam stands diagonally across the line of travel, a revoluble disk plow journaled to the rear diagonal portion of the beam, furrow, land and trailing wheels upon which the beam is adjustably carried, and means connecting with the furrow-wheel and the draft attachments by which the direction of travel may be varied either manually or by the turning of the team.

8. In a gang-plow with beams and disks journaled thereto as shown, a vertical swivel-post by which the furrow-wheel is carried, an arm fixed to the post, a second arm centrally pivoted to the end of the first-named arm, a turnable bell-crank lever to one arm of which the team is connected, connection between the other arm of the bell-crank lever and one end of the second pivoted arm aforesaid, and a connection between the other arm of said pivoted arm and a manually-operated lever.

9. In a disk plow, a plow-beam diagonally supported with relation to the line of travel, vertically-adjustable furrow and landside wheels, a freely-swiveling trail-wheel, a vertical turning post having a horizontal axle portion for the trail-wheel, and a stop-block movable to lock or to release the trail-wheel, and having its lower end inclined diagonally to the horizontal portion of the axle.

In testimony whereof I have hereunto set my hand in presence of two subscribing witnesses.

WILLIAM S. COOK.

Witnesses:
F. L. BURRELL,
W. C. ANDERSON.